(No Model.) 2 Sheets—Sheet 2.
J. L. SHEPPARD.
MACHINE FOR MIXING GRAIN.
No. 298,904. Patented May 20, 1884.
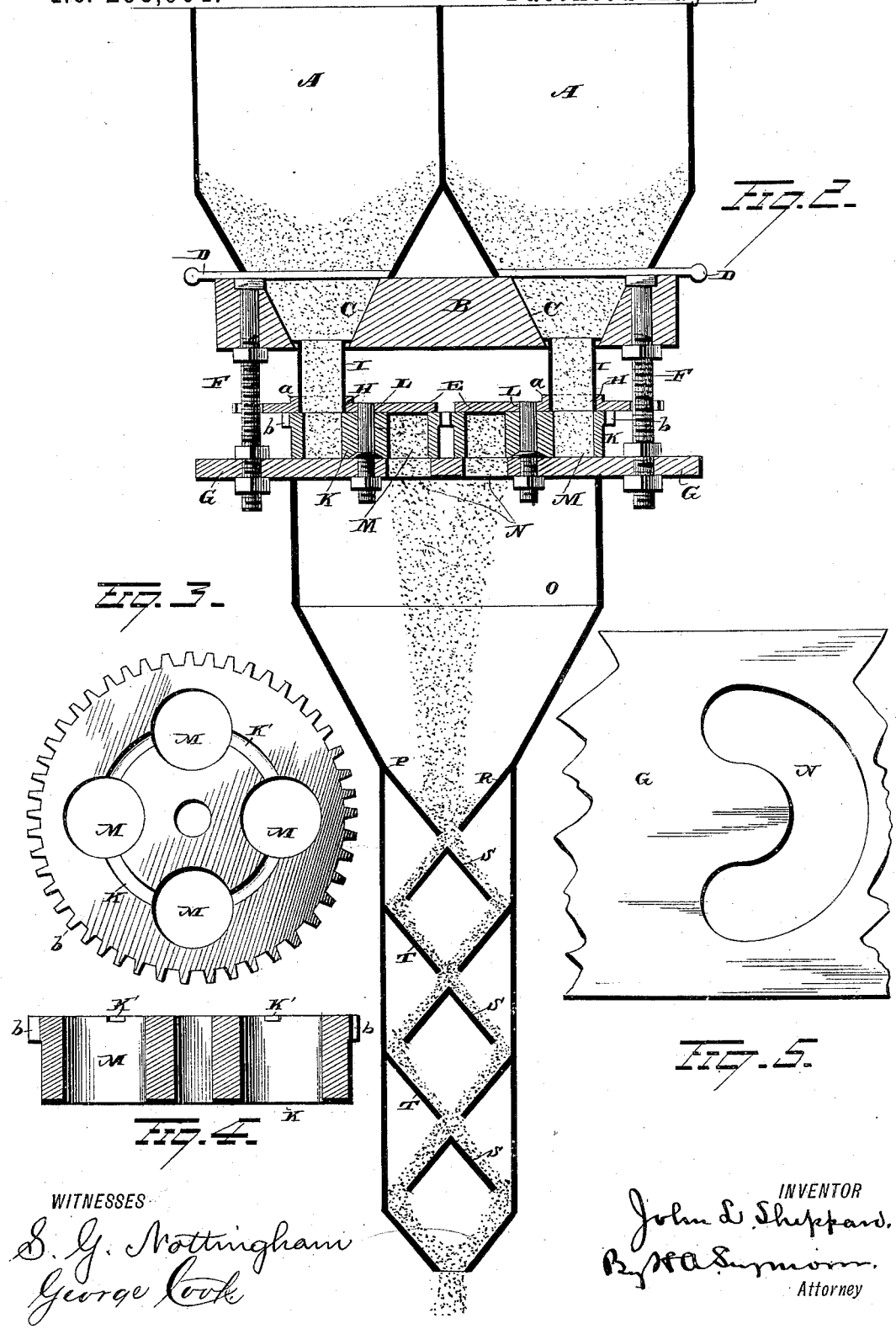
WITNESSES
S. G. Nottingham
George Cook
INVENTOR
John L. Sheppard.
By H. A. Symons.
Attorney

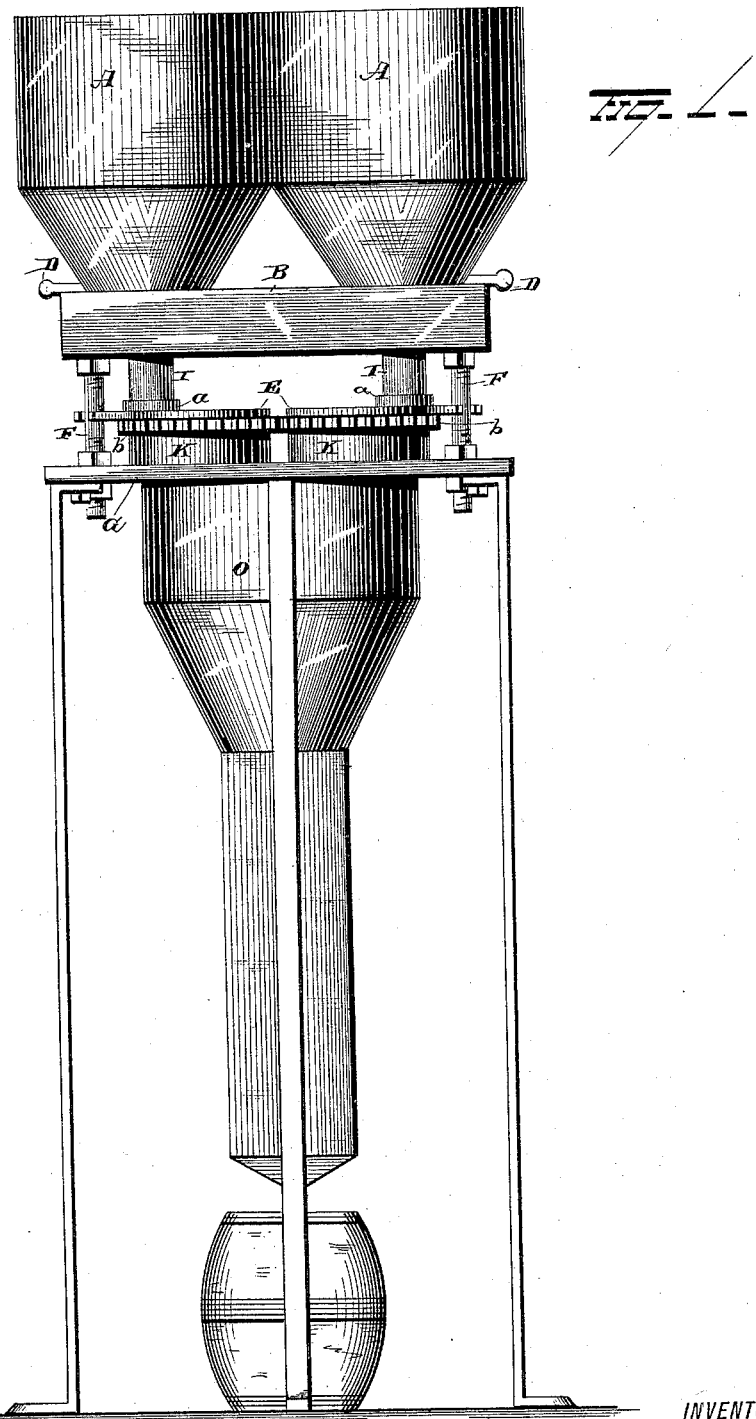

UNITED STATES PATENT OFFICE.

JOHN L. SHEPPARD, OF CHARLESTON, SOUTH CAROLINA.

MACHINE FOR MIXING GRAIN.

SPECIFICATION forming part of Letters Patent No. 298,904, dated May 20, 1884.

Application filed January 4, 1884. (No model.)

*To all whom it may concern:*

Be it known that I, JOHN L. SHEPPARD, of Charleston, in the county of Charleston and State of South Carolina, have invented certain new and useful Improvements in Machines for Mixing Grain; and I do hereby declare the following to be a full, clear, and exact description of the invention, such as will enable others skilled in the art to which it appertains to make and use the same.

My invention relates to an improvement in machines for mixing grain, the object being to blend or mix small and irregular lots of grain so as to produce one lot of uniform grade or quality; and with this end in view my invention consists in certain novel features of construction and combinations of parts, as will be hereinafter fully described, and pointed out in the claims.

In the accompanying drawings, Figure 1 is a view in side elevation of my improved mixer. Fig. 2 is a view in section. Fig. 3 is a top plan view of one of the wheels, and Fig. 4 is a sectional view of the same. Fig. 5 is a view showing opening in lower plate.

A A represent the bins, adapted to hold the different grades of grain to be mixed, and which can be built directly on the top of the machine, or at a distance above it, and connected therewith by chutes or ducts.

B represents the floor of the bins, provided with openings C, adapted to be opened and closed by the slides D, thereby cutting off and letting on the supply of grain to the machine below.

E are metal plates, securely held in position by the bolts F, depending from the floor of the bin, said bolts also supporting the lower metal plate, G. The plates E are provided with openings H, connected with the openings C of the floor B by the tubes I, the plates E being preferably provided with flanges $a$ around the openings adapted to keep the lower ends of the tubes in position, and to prevent any grain from escaping. Between the plates E and G are located the drum-like wheels K, adapted to turn around the pivots L, secured to the plate G. These wheels are provided with openings M, adapted when the wheels revolve to register with the openings in the plates E. The wheels are also provided on their peripheries with the cogs $b$, adapted to mesh with each other, as shown in Fig. 1. The openings in the wheels are also adapted to register with an opening or openings N, formed at or around the center of the lower plate, G. It will now be seen that when motion is imparted to the wheels K the grain falls from the bins, passes through the openings C and down through the tubes I, and fills the cups or holes M in the wheels K in succession, the grain being prevented from falling out of the wheels by the plate G until the said holes M in the wheels register with the openings N in the plate G. The upper face of each of the wheels K is provided with a groove, K', adapted to prevent jamming and breakage of the grain, which would occur at the time the supply of grain was being cut off from the revolving wheels. By means of this groove any grain caught between the edges of the cups in the wheels and openings in the plate E is forced into the grooves, and thereby prevented from being broken or injured.

Beneath the plate G is located the bin O, into which the grain falls through the openings N in the plate G, the wheels discharging the grain in said bin simultaneously. The bin is provided with inclined sides which converge to a point, after which they descend parallel. At the point P the sides of the bin are provided with the inclined shelves R, which direct the different qualities of grain falling thereon toward each other, thereby mixing the same. Below the shelves R the adjacent sides of the bin are provided with the inclined shelves S, which tend to divide the volume or flow of the grain, which latter, after falling off the shelves S, drops onto the shelves T, similar to the shelves R, and so on down until the end of the bin O is reached, where the grain issues thoroughly mixed. The grain being discharged simultaneously from the wheels, partially mixes in its descent to the sides of the bin O, and then by dividing and uniting alternately the volume or flow of the grain by the above-described arrangement of partitions or shelves in the bin, it is discharged thoroughly mixed.

If it is desired to mix unequal quantities of grain, the cups or holes in one or more wheels are formed larger than those in the others in proportion to the quantities of each kind of grain to be mixed; or two or more bins can be supplied with the same grade of grain. By means of the slides D the supply of grain may be regulated or cut off altogether. The wheels K can be operated by a pinion, which latter meshes with one of said wheels. This pinion can be driven by a hand-crank or by a belt.

My invention is exceedingly simple in construction, is efficient in use, and by the employment of wheels formed with large and wheels with smaller openings a great variety of combinations may be produced.

While I have shown but two wheels in the drawings, I in nowise limit myself to such number, as four or more wheels may be used with equally good results. Neither do I limit the application of my improvement to mixing grain, as it with slight changes might be used for mixing phosphates, paints, liquids, &c.

As many slight changes might be made in the construction and relative arrangement of the different parts without involving a departure from the spirit of my invention, I would have it understood that I do not limit myself to the exact construction shown and described, but consider myself at liberty to make such changes and alterations as fall within the spirit and scope of my invention.

Having fully described my invention, what I claim as new, and desire to secure by Letters Patent, is—

1. The combination, with two or more bins, a single commingling-bin located below said bins, and an intervening plate constructed to allow of the passage of grain from the bins through the plate and into the commingling-bin, of wheels or rotary carriers situated over said plate, and constructed and arranged to convey the grain from the exit-opening of the bins and discharge it into the commingling-bin, substantially as set forth.

2. The combination, with two or more bins, a single commingling-bin located below said bins, and an intervening plate constructed to allow of the passage of the grain from the bins through the plate and into the commingling-bin, of wheels or rotary carriers constructed with a series of receptacles arranged to register with the discharge-openings of the upper bins and the openings in the intervening plate, substantially as set forth.

3. The combination, with two or more bins, the bottoms of which are provided with openings, of plates provided with openings registering with those of the bins, two or more wheels located under said plates and provided with openings, and a plate under said wheel provided with central openings through which the grain falls, substantially as set forth.

4. The combination, with two or more bins, provided at their bottoms with openings, of plates E, located below the bins and also provided with openings, a plate located below said plates E and provided with openings, and wheels meshing with each other and provided with openings adapted to simultaneously discharge the grain through the openings in said latter plate, substantially as set forth.

5. The combination, with two or more bins provided with openings at their bottoms, of plates E, plate G, wheels pivoted to the plate G and provided with grooves K', and with openings adapted, when revolved, to simultaneously discharge the grain through the plate G, tubes connecting the bins with openings in the plates E, and slides to cut off the supply of grain from the bins, substantially as set forth.

6. In a machine for mixing grain, &c., the combination, with two or more bins and two or more discharging-wheels situated below said bins, of a commingling-bin provided with the shelves R and T and the shelves S, all of the above parts combined as described.

7. The combination, with two or more bins, of a lower common bin provided with inclined shelves or mixers, and intermediate mechanism for discharging said grain from the upper bins in desired proportions into and from the said lower bin, substantially as set forth.

In testimony whereof I have signed this specification in the presence of two subscribing witnesses.

JOHN L. SHEPPARD.

Witnesses:
  J. L. HONOUR,
  J. C. DILLINGHAM.